UNITED STATES PATENT OFFICE.

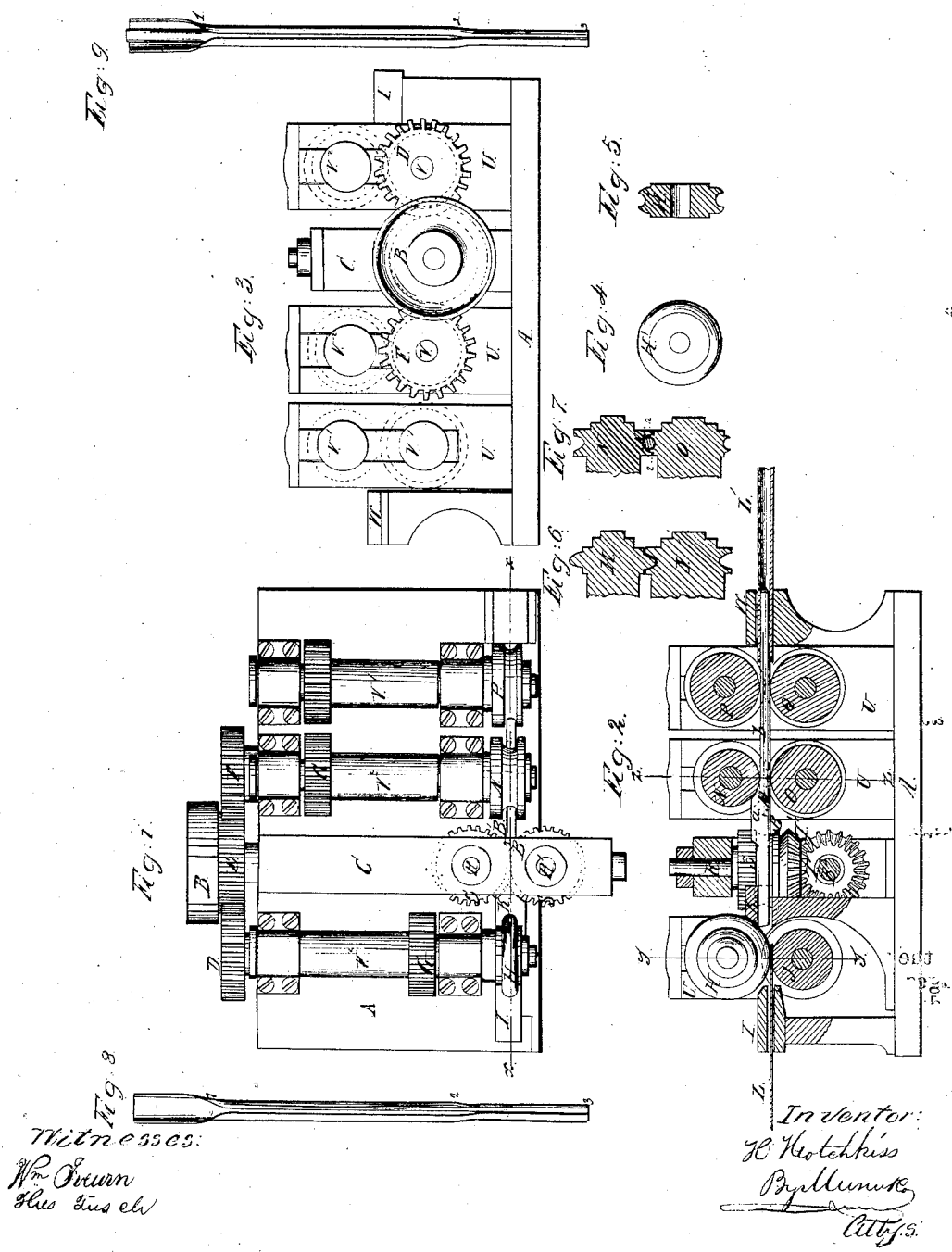

HORACE HOTCHKISS, OF PLAINFIELD, NEW JERSEY.

IMPROVEMENT IN MACHINES FOR MAKING METAL TUBES.

Specification forming part of Letters Patent No. 56,561, dated July 24, 1866.

*To all whom it may concern:*

Be it known that I, HORACE HOTCHKISS, of Plainfield, in the county of Union and State of New Jersey, have invented a new and useful Improvement in Machines for Forming Tubes Made of Sheet Metal; and I do hereby declare that the following is a full, clear, and exact description thereof, which will enable others skilled in the art to make and use the same, reference being had to the accompanying drawings, forming part of this specification, in which—

Figure 1 is a plan view of a machine made according to my invention. Fig. 2 is a vertical section taken on the line $x$ of Fig. 1. Fig. 3 is a side elevation. Figs. 4 and 5 are detailed views of one of the rolls which form the handles. Fig. 6 is a section on the line $y$, Fig. 2, of the rolls H J. Fig. 7 is a section on the line $z$, Fig. 2, of the rolls N O. Figs. 8 and 9 illustrate the action of the different rolls in the formation of umbrella-handles with a wooden rod inclosed therein, and also without such a rod.

This invention consists in certain mechanism for forming tubes made of sheet metal. The material to be operated upon is introduced into the machine in a flat state, and is drawn through it between rolls whose form is such as eventually to produce the tube to be made.

The housings and operative parts of the machine are sustained upon a bed-plate, A. B is a driving-pulley, whose shaft $B^3$ is journaled in a frame, C, which extends beyond that side of the bed-plate which is farthest from the driving-pulley. E is a gear-wheel attached to the inner side of the said pulley. It engages the gears D and F, set on the adjacent ends of the shafts V V, and causes them to have rotary motion in the same direction.

The shafts V V' $V^2$ are journaled in stands U, which rise from the bed-plate, and they carry at one end the series of rolls which form the articles to be made. The shaft $B^3$ of the driving-pulley carries a bevel-gear, T, which is fixed thereon at a point within the frame C. This bevel-gear engages another bevel-gear, T', on a vertical shaft, R, which passes upward through the top of the frame C. This vertical shaft carries a gear, S, which engages another gear, S, on another vertical shaft, R', and both these shafts have horizontal compressing-rolls, (designated by the letters B' $B^2$, see Figs. 1 and 2,) whose office is to support and guide the material to be operated on as it passes through the machine, the place of the shafts R R' which carry said rolls being on opposite sides of the path of such material.

The shafts $V^2$ $V^2$ are driven from the shafts V V by means gear-wheels G, whose size is the same, so that each shaft has the same speed. The shafts V' V' are geared to each other, so as to have the same speed, and they are driven by the frictional contact of the tube or handle with their rolls P Q, or by any suitable connections. The shafts V V' $V^2$ carry the several pairs of rolls hereinafter described.

I is a hollow guide set in front of the first pair of rolls, H J, through an opening in which the material to be operated on is passed to said rolls. The opening therein is to be wide enough for the free passage of the blank. The rolls H J are male and female, and are set one over the other. In this example the roll H is the male, and a cross-section of their faces is seen in Fig. 6. In passing between them the blank L is bent up by the grooved face of the roll J over the convex face of the roll H, so as to take the shape shown at the part 1, Fig. 8. The blank passes thence through the hollow guide K, which has attached to its upper side the inner end of a spindle, M, that extends thence, between the guide-rolls B' $B^2$ and the two succeeding pairs of rolls N O and P Q, into the guide W. Space is left in the guide K around the bottom and sides of the spindle, so that the blank L can pass through it without hindrance. After going through the guide K the blank passes between the guide-rolls B' $B^2$, whose peripheries are grooved, so that their grooves press the edges of the blank against the sides of the spindle. It passes thence between the rolls N O, the form of whose faces is seen in Fig. 7. Both of these rolls are grooved; but the groove of the upper roll, N, is wide enough to embrace the flanges 2 of the lower roll, and the sides of the blank now bent up, as shown in the part 1 of Fig. 8, will come in contact with the sides of said groove, and be bent closer together, so as to take the form marked 2 in Fig. 8.

It will be observed that the spindle M has a spine or rib along its upper side, between the horizontal rolls B' B² and the rolls N O, the object of which is to support and guide the bent sides of the blank L, and also keep the same from twisting while passing through this portion of the machine. This spine declines in height at the point where the spindle enters between the rolls N O, and from thence to the rolls P Q it is considerably less in height, and from the point where it comes between the latter rolls it is made perfectly round and of less diameter than the circle which is made up of the sum of their grooves, so that there is an annular space left about the spindle within the space inclosed by said last-mentioned rolls, whereas the spine or upper side, $b$, of the spindle comes up quite near to the bottom of the groove of the roll N, so that when the blank is passing that roll the spine serves as a bed, against which the edges of the blank are pressed by the sides of the groove of that roll, whereby the blank or skelp is kept from becoming twisted or diverted from its proper path while passing through the rolls.

When the blank reaches the rolls P Q it is of the form marked 2 in Fig. 8, its edges being brought nearer together than at the part 1. In passing between these rolls its edges are brought quite together, the diameter of the groove of the roll P being such as to make, with that of the roll Q, a complete circle whose circumference will embrace the body of the handle or tube to be formed. The blank therefore, when it emerges from these rolls, takes the form of the part marked 3 in Fig. 8. It is received thence into the hollow guide W, whence it emerges after the manner shown in Fig. 2.

When it is desired to form the handle or tube upon a stock or body which is to be permanently inclosed within it, I remove the roll H and place on its shaft a grooved roll, H', formed as seen in Figs. 4 and 5. Its groove should be of the diameter of the stock or body to be inclosed, and its flanges must come within the flanges of the female roll J.

The guide I is also to be replaced by one which will admit the said stock above the blank L, and the spindle M is to be removed. When the blank and its stock pass between the rolls H' and J the sides of the blank will be forced up by the roll J against the outer sides of the flanges of the roll H', as illustrated in the part 1 in Fig. 9, and the blank and stock will together pass through the guide K and between the compressing horizontal rolls B' B², which will force the sides of the blank closer up to the sides of the stock between the succeeding rolls N O, whence it will emerge in the condition of the part marked 2, Fig. 9. During its passage between the last pair of rolls the edges of the blank are drawn close together, so as to completely inclose the stock within it, as illustrated in the part marked 3 in Fig. 9.

The last pair of rolls are finishing-rolls, and must have such a shape as it is desired to give the completed article.

The object of the spindle-guide is to keep the blank in its proper position while being bent up by the rolls, and it will be observed that its shape is made to conform to the shape of the rolls through which it passes. Its spine or ridge $a$ prevents the blank from becoming twisted or bent laterally while passing the horizontal rolls B' B², and causes it to be directed with accuracy to the rolls N O.

I do not wish to confine myself to any particular number or form of guides or swaging and bending rolls, since they can be changed in both respects according to the work to be accomplished without departing from the principle of my invention.

The rolls are to be set sufficiently near each other to give the required character and shape to the blank, and they may be placed in adjustable bearings for the purpose of adjusting their distance apart.

I have not shown any gear-connection for driving the last pair of rolls; but they are to be driven in any convenient way.

Having thus described my invention, I claim as new and desire to secure by Letters Patent—

1. In machines for bending plates of metal into convex or tubular forms, the combination of the guide-spindle M, constructed as described, with a system of guides of suitable form for the different stages of the work, and a system of rolls or their equivalents, between which the work is formed into the required shape, substantially as described.

2. The guide-spindle M, constructed and applied substantially as and for the purpose described.

3. The rolls N O, constructed and operating in the combination shown substantially as described.

H. HOTCHKISS.

Witnesses:
M. M. LIVINGSTON,
C. L. E. TOPLIFF.